(12) United States Patent
Ylonen

(10) Patent No.: US 6,782,474 B1
(45) Date of Patent: Aug. 24, 2004

(54) NETWORK CONNECTABLE DEVICE AND METHOD FOR ITS INSTALLATION AND CONFIGURATION

(75) Inventor: Tatu Ylonen, Espoo (FI)

(73) Assignee: SSH Communication Security Ltd., Espoo (FI)

( * ) Notice: Subject to any disclaimer, the term of this patent is extended or adjusted under 35 U.S.C. 154(b) by 0 days.

(21) Appl. No.: 09/326,003

(22) Filed: Jun. 4, 1999

(30) Foreign Application Priority Data

Jun. 10, 1998 (FI) .................................................. 981324

(51) Int. Cl.$^7$ .......................... H04L 9/00; G06F 15/177
(52) U.S. Cl. ......................... 713/162; 713/201; 380/30; 709/220
(58) Field of Search ................................ 713/201, 162, 713/160, 168, 194; 380/30, 282; 709/220–221, 231, 240, 250

(56) References Cited

U.S. PATENT DOCUMENTS

| | | | | |
|---|---|---|---|---|
| 5,757,922 A | * | 5/1998 | Shiroshita | ..................... 380/42 |
| 6,092,191 A | * | 7/2000 | Shimbo et al. | ............. 713/153 |
| 6,101,255 A | * | 8/2000 | Harrison et al. | ............... 380/52 |
| 6,154,839 A | * | 11/2000 | Arrow et al. | ................ 713/154 |
| 6,240,513 B1 | * | 5/2001 | Friedman et al. | ........... 713/152 |
| 6,424,717 B1 | * | 7/2002 | Pinder et al. | ............... 380/239 |

* cited by examiner

*Primary Examiner*—Gilberto Barrón
*Assistant Examiner*—K Zand
(74) *Attorney, Agent, or Firm*—Ronald C. Fish; Ronald C. Fish, A Law Corp.

(57) ABSTRACT

A network device (100, 300) is connected to a network (102) having also a management station (107) connected thereto. The method for configuring the network device comprises the steps of transmitting from the management station a configuration packet to the network device (201), authenticating at the network device the management station as the genuine transmitter of the configuration packet (202) and decoding the configuration parameters contained in said configuration packet and storing them as the configuration parameters of the network device (203).

16 Claims, 4 Drawing Sheets

```
          NEW NETWORK DEVICE                          MANAGEMENT STATION
                                                                                601
                                                       SEND CONFIGURATION  ___/
                                                       PACKET (TO BROADCAST
   602   COMPUTE DEVICE IDENTIFIER       <----              ADDRESS)
    \__  FROM RECEIVED PUBLIC KEY;
         CHECK DEVICE IDENTIFIER
                    |
                    V
   603   COMPUTE SHARED SECRET;
    \__  SET UP COMMUNICATIONS
                    |
                    V
   604   SEND REPLY PACKET    -------->                                       605
    \__                                       COMPUTE DEVICE IDENTIFIER   __/
                                              FROM RECEIVED PUBLIC KEY;
                                                CHECK DEVICE IDENTIFIER
                                                         |
                                                         V               606
                                              COMPUTE SHARED SECRET;   __/
                                                SET UP COMMUNICATIONS
                                                         |
                                                         V                    607
                                          .-----------------------------------.___/
                                          :    OTHER PACKET EXCHANGE         :
                                          '-----------------------------------'
```

NETWORK CONNECTABLE DEVICE AND METHOD FOR ITS INSTALLATION AND CONFIGURATION

TECHNOLOGICAL FIELD

The present invention deals with a device to be connected to a network and especially its installation and configuration. Installation is a general concept that covers all the hardware operations needed to connect the device to a network. Similarly configuration is understood to cover all the software operations that enable controlled transmission of data in the network between the device concerned and other devices connected to the network. The invention does not limit the type of network in question: it can be the Internet, an intranet, a Local Area Network (LAN), a Wide Area Network (WAN) or any other network intended for transmission of data between electronic terminals. The physical form of the network may be Ethernet(, Token Ring(, cellular radio network or any other corresponding network known as such.

BACKGROUND OF THE INVENTION

Intelligent network devices, such as routers, VPN (Virtual Private Network) devices, print servers, network printers, network cameras, and telecommunications adapters, require detailed configuration data before they can transmit and receive information through the network in a controlled manner. For instance in an IP (Internet Protocol) network the device needs to know its own IP address and the address of the default gateway, and possibly lots of other configuration data.

Information travels through the network generally in the form of packets. As background information for the invention, two known addressing schemes for IP packets are described, namely the IPv4 (Internet Protocol version 4) and IPv6 (Internet Protocol version 6) packet headers. The layout of an IPv4 packet header is illustrated in FIG. 1, and the layout of an IPv6 packet header is illustrated in FIG. 2. Column numbers in FIGS. 1 and 2 correspond to bits.

In FIG. 1, the fields of the known IPv4 header are as follows: Version Number 101, IHL 102, Type of Service 103, Total Length 104, Identification 105, Flags 106, Fragment Offset 107, Time to Live 108, Protocol 109, Header Checksum 110, Source Address 111, Destination Address 112, Options 113 and Padding 114. In FIG. 2, the fields of the known proposed IPv6 header are as follows: Version Number 201, Traffic Class 202, Flow Label 203, Payload Length 204, Next Header 205, Hop Limit 206, Source Address 207 and Destination Address 208. The use of the fields in the headers is known to the person skilled in the art. An IP packet consists of a header like that of FIG. 1 or 2 accompanied by a data portion. In IPv6, there may be a number of so-called Extension headers between the main header shown in FIG. 2 and the data portion.

In a network where security features are important, an authentication may be performed by computing a Message Authentication Code (MAC) using the contents of the packet and a shared secret key, and sending the computed MAC as a part of the packet in an AH (Authentication Header) or ESP (Encapsulating Security Payload) header. Privacy is typically implemented using encryption, and the ESP header is used. The AH header is illustrated in FIG. 3, where column numbers correspond to bits. The fields of the known AH header are as follows: Next Header 301, Length 302, Reserved 303, Security Parameters 304 and Authentication Data 305. The length of the last field 305 is a variable number of 32-bit words.

The Encapsulating Security Payload (ESP) may appear anywhere in an IP packet after the IP header and before the final transport-layer protocol. The Internet Assigned Numbers Authority has assigned Protocol Number 50 to ESP. The header immediately preceding an ESP header will always contain the value 50 in its Next Header (IPv6) or Protocol (IPv4) field. ESP consists of an unencrypted header followed by encrypted data. The encrypted data includes both the protected ESP header fields and the protected user data, which is either an entire IP datagram or an upper-layer protocol frame (e.g., TCP or UDP). A high-level diagram of a secure IP datagram is illustrated in FIG. 4a, where the fields are IP Header 401, optional other IP headers 402, ESP header 403 and ecrypted data 404. FIG. 4b illustrates the two parts of an ESP header, which are the 32-bit Security Association Identifier (SPI) 405 and the Opaque Transform Data field 406, whose length is variable.

Several existing solutions are being used to configure newly installed network devices. Some devices have a display and keyboard for entering configuration data. Others may have a serial port in the device so that it can be attached to a separate configuration terminal for configuration. There are also solutions where a broadcast network packet or a ping packet is used to configure the device.

Solutions based on having a display and keyboard are often too costly and cumbersome for users. Likewise, attaching a configuration terminal to the device is an extra burden for the user. Methods based on broadcast packets only work in the local network, and cannot be used to configure the device remotely. Remote configuration is becoming more and more desirable, as the number of installed network devices is growing much faster than the number of people skilled enough to configure them. Finally, methods based on a ping packet can be used to configure the device remotely, but are limited in the amount of configuration data. Also, such methods will not work if the device to be configured is behind a device that is also listening for several other configuration packets or if there are similar identical devices on the same network.

Growing use of networks, especially increasing use of the Internet for electronic commerce and corporate communications is making security ever more important. Attacks against the network infrastructure are increasingly common. One opportunity for performing such attacks is the moment when the network device is being configured. At that time, most devices do not provide any security, and the attacker will be able to load the device with his/her configuration and software. The compromised device can then be instrumental in furthering the attack.

SUMMARY OF THE INVENTION

The existing configuration methods for configuring network devices lack ease of use, robustness, and security. Problems during device configuration are often very. difficult for users to understand and solve. It is therefore desirable to provide a method and apparatus for loading configuration data into the network device in a reliable, easy-to-use manner from a network management station controlled by an employee skilled in configuration of new network devices. This allows physical installation of new network devices to be carried out by employees that are not as skilled in configuration of new network devices. This genus of methods and apparatus will be referred to as the unsecure, remote configuration class. Further, in some networks where security is an issue, it is desirable to be able to configure new network devices remotely and securely from a remote network management station. This allows remote configuration via network packets without fear that an interloper with intent to attack the network will be able to intercept and alter the configuration data or other information such as network address or device identifier. The object of this invention is to provide methods, as well as a network device which can carry out the disclosed methods.

The object of the unsecure, remote configuration methods of the invention is accomplished by installing the network device in a dummy mode, and sending a configuration packet, including a device-specific identifier, to the network device to be configured or reconfigured either by broadcasting a packet containing the new network device's device identifier or sending a configuration packet directly to the network device's network address with the packet containing the device identifier of the device to be configured. The new network device to be remotely configured then either recognizes its device identifier in the broadcast packet or recognizes its device identifier in the packet sent directly to its network address, and uses the data therein to configure itself.

The object of the secure, remote configuration methods of the invention is accomplished by: transmitting the configuration packet from a remote network management station to the network device to be configured or reconfigured either by broadcast or by direct transmission to the network address of the device to be configured, authenticating the configuration packet at the network device to be configured or reconfigured as being from the proper network management station and containing the proper device identifier or by at least verifying that the configuration packet contains the properly encrypted device identifier which could only have been encrypted by the authentic network management station or some other secure information derived from the device identifier which can serve as a reliable indicator of the source of the configuration packet, and then decrypting and using the contents of the authenticated packet to configure the new network device.

It is characteristic of the secure, remote configuration method according to the invention that it comprises the steps of
- transmitting from the management station a configuration packet to the network device,
- authenticating at the network device the management station as the genuine transmitter of the configuration packet and
- decoding the configuration parameters contained in said configuration packet and storing them as the configuration parameters of the network device.

The invention applies as well to a network device, of which it is characteristic that it comprises a computing block arranged to
- compute device identifiers from cryptographic keys derived from recognised packets and
- compare computed device identifiers against information used to verify known device identifiers for authentication of transmitting parties.

According to the invention, each new network device to be configured has a device identifier used to authenticate the device. There is also a management station connected to the network and used to remotely configure freshly installed network devices. The invention does not limit the nature of the device identifier; on the contrary, it should be understood very generally as something that can be used to identify a network device. According to a first embodiment of the invention, the management station knows the device identifier, IP address, default gateway, and other information needed to configure each new network device. When a new network device has been installed into the network it operates initially in a dummy mode where it only reads device identifiers from the packets it receives but does not otherwise process any data transferred in the network (or processes data in a factory-configured manner). The management station sends a specially formatted packet to the broadcast address of the network in which the new network device resides. The special packet contains an identifying code derived from the device identifier of the new network device and possibly other data. Whenever the new network device receives a packet, it checks whether the packet is a special packet with the identifying code matching its own device identifier. If the code matches, the device decodes the special packet, retrieves the configuration information from it and starts using its new configuration. It may also engage in a further information exchange with the management station to obtain further configuration data and to provide feedback to the management station user. In place of the identifying code derived from the device identifier the packet sent by the management station could also be a factory-configured (or generally preconfigured) address other than IP address, e.g. ethernet address, or some other kind of device identifier that the network will recognize.

According to a second embodiment of the invention the network device has its P address preconfigured manually before it is installed in the network. Thereafter, the management station may send a configuration packet directly to that address; the network device may even send a packet first to a preconfigured management station address to let it know it is there and wants to be configured.

According to a third embodiment of the invention the network device may obtain its IP address automatically from the network, e.g. using DHCP (Dynamic Host Configuration Protocol). According to a fourth embodiment of the invention the network device might respond to an ARP (Address Resolution Protocol) packet for IP addresses of some format, e.g. after a short delay to give a possible real owner of the address time to respond.

Security against any network-level attacks can be provided with the method. The device identifier is most advantageously derived from a cryptographic public key. The device identifier may also be the cryptographic key itself or a certificate accompanying it. Both the new network device and the management station may know the other device's device identifier beforehand so that they may recognise a received packet as coming from the correct sender. Alternatively each device may display the identifier computed from data received from the other party to the user and have the user confirm that the identifier is correct. This is called a (manual) verification of the device identifier. Both the new network device and the management station verifies that the cryptographic public key received from the other side matches the (manually) verified device identifier. Then, they cryptographically generate a shared secret using the authenticated cryptographic public keys. One implementation of this is to have each cryptographic public key be a Diffie-Hellman public value. After the authentication and verification stages the configuration may proceed safely.

The present invention provides a method to remotely configure a network device in a reliable, easy-to-use manner from a separate management station (which can be another network device). Optionally, the method can provide security.

The method enables devices to be installed by fairly unskilled support personnel, and the technically more demanding configuration operation can be performed by an expert from a management station without needing to travel to the installation site.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings. Features well-known as such have not been described in detail so as not to obscure the invention.

DETAILED DESCRIPTION OF THE INVENTION

The invention is here described in terms of a network device attached to an IP (Internet Protocol) network. However, the present invention is equally applicable to other network protocols.

Figure 1:
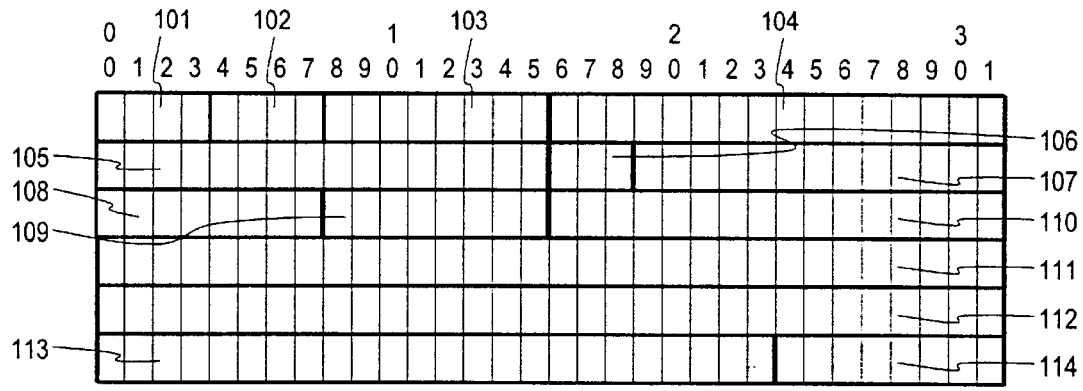
FIG. 1 illustrates a known IPv4 packet header.
Figure 2:
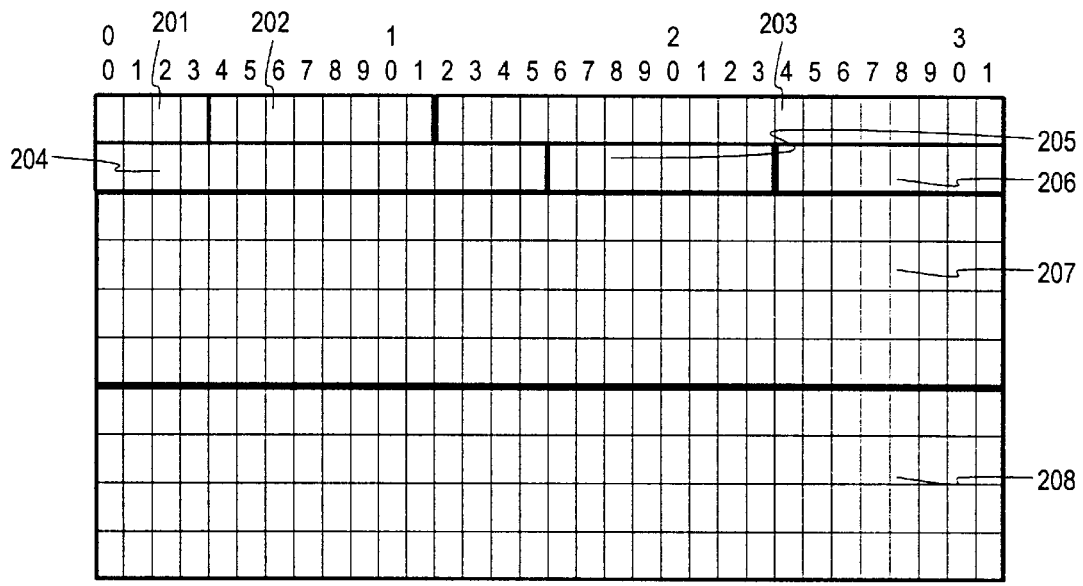
FIG. 2 illustrates a known IPv6 packet header.
Figure 3:
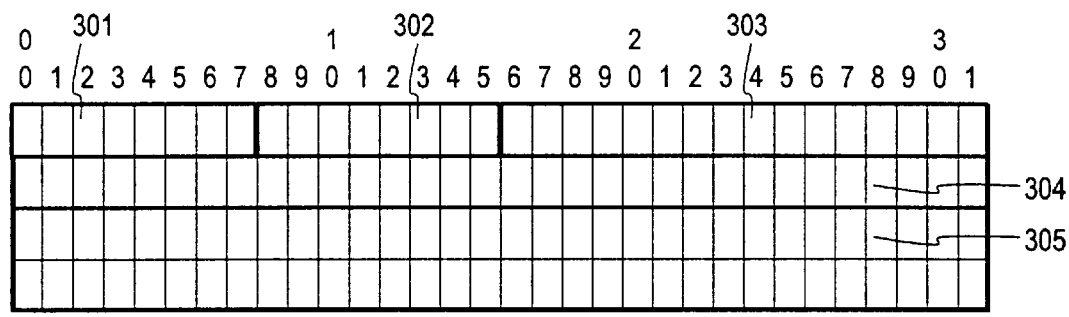
FIGS. 3, 4a and 4b illustrate other known packet headers.
Figure 4A:
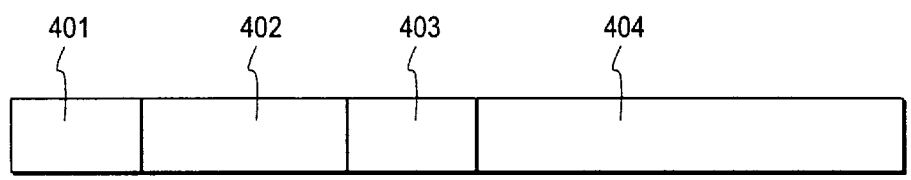
Figure 4B:
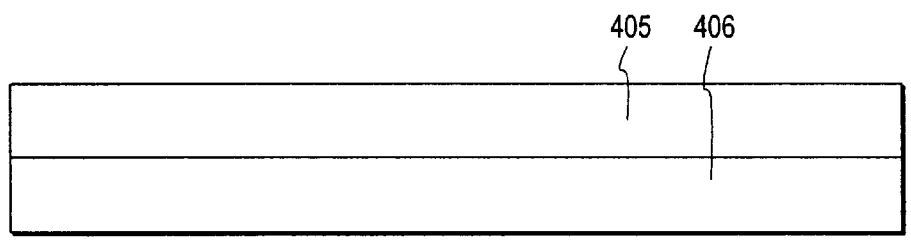
Figure 5:
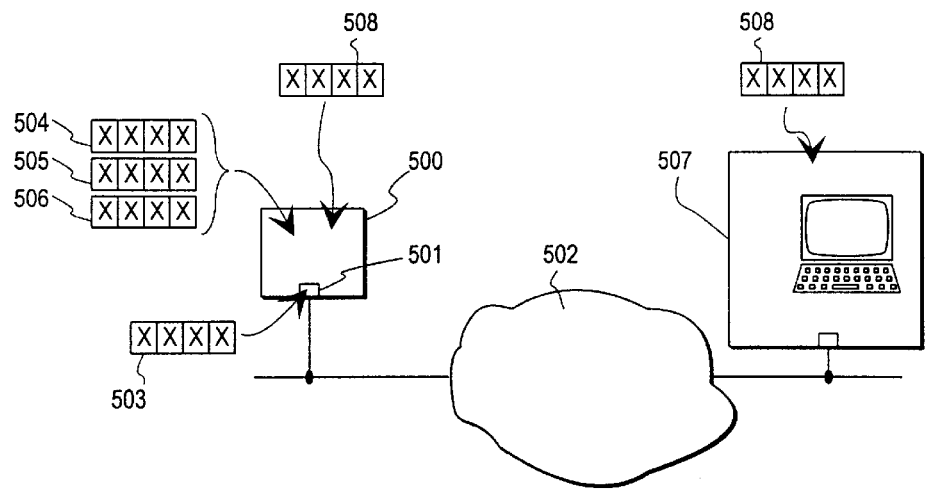
FIG. 5 illustrates some features of a network and a network device.

A network device 500 in FIG. 5 is a device that has one or more network interfaces 501. A network interface is a connection to the physical network 502, such as an Ethernet (network, a mobile radio network or some other network. In most networks, each network interface has one or more network addresses 503 that identify the network interface as the transmitter and/or receiver of packets. Network addresses are character strings; in FIG. 5 the characters are represented generally by X's. In an IP network the network address 503 is an IP address. The network knows how to route packets from a transmitting network address to a receiving network address from anywhere in the network. Such routing may involve travelling through multiple network devices, each device sending the packet down a link that it thinks will bring the packet closer to its final destination.

As a network device comes from the manufacturer, it has normally no information about the network address or other configurable data it will have when it is installed in a network. Such configuration data needs to be entered into the device either before or after the device is physically connected to the network in the appropriate location.

Configuration data is data that the network device needs to know before it can start normal operation. Typically, such data would include an IP address 503, netmask 504, default gateway address 505, and operational parameters 506 for the network device 500. Configuration data may also include new software to be downloaded to the device.

A management station 507 is a network device that will provide the newly installed device with configuration data. It may, but need not, maintain communications with the new network device also after installation. The management station usually has a user interface (keyboard and display).

Part of the present invention is that each network device 500 (and management station 507) can have a device identifier 508, which is a public character string that could e.g. be printed on a sticker and attached to the bottom of the device.

The device identifier 508 serves two purposes. Firstly it identifies the device to be configured, so that if multiple devices using the same configuration method are attached to the same network, or there are other network devices on the path that the configuration packet needs to travel to reach its destination, the appropriate network device can be identified and other devices can ignore configuration data which is not intended for them. The other, more important purpose of the device identifier is that if it is derived from an appropriate cryptographic key, the device being configured and the management station can use it to authenticate each other, and to exchange cryptographic keys with each other securely. The device identifier is optional, but multiple configurable devices on the same network cannot be distinguished and security cannot be guaranteed without device identifiers.

It is possible to have the device generate its own device identifier (e.g. when it is first powered on) by some method known as such, and e.g. display the device identifier on screen if the device has one. This may be desirable in some cases to make all devices be identical when they leave the factory.

The device identifier is used for identifying the particular network device being configured by having the initial packet (s) sent to it contain either the device identifier directly, or some information derived from the device identifier (such as a hash of it and some other data). All receiving devices can then ignore configuration packets that are not destined to themself by checking the device identifier (or derived information) in each received configuration packet. To ease troubleshooting by users, the network device may display a warning if it sees a configuration packet that is not destined to itself. Device identifiers may also contain parity bits or other data that can be used to validate that a user has typed them in correctly.

To use the device identifier for security, it is a value derived from a cryptographic public key. The public key can be a Diffie-Hellman public value, an RSA (Rivest-Shamir-Adelman) key, a DSA key (Digital Signature Algorithm; U.S. Government Digital Signature Standard), or some other public key. The use of Diffie-Hellman public values is known from patents U.S. Pat. No. 4,218,582 and U.S. Pat. No. 4, 200,770, and the use of RSA keys is known from patent U.S. Pat. No. 4,405,829. For security, the device identifier should be derived from the public key in a way that makes it very hard to come up with another public key that would have the same identifier. One possible method is to use a cryptographic hash function (e.g. SHA1; Secure Hash Algorithm 1) to compress the public key, and then use an appropriate number of bits from the returned hash value. The use of the SHA1 algorithm is known from the publication "NIST, FIPS PUB 180-1, Secure Hash Standard, April 1995". To make the device identifier easier for users to communicate, it is also possible to further process it for readability, e.g. by converting it to short English words similarly to what is used by some one-time-password methods.

An advantageous embodiment of the method according to the invention will be described below with reference to FIG. 6, where a multitude of possible authentication features are included. Later on it will be mentioned, which steps of the method are optional and not necessarily required by the invention.

To configure a new network device that has been installed in the network, the management station sends at stage 601 a specially formatted configuration packet to the new network device. The packet will be addressed so that the new network device will be able to see it. The exact method of doing this depends on the network protocol that is used and on the embodiment of the invention that is applied. In an IP network, the configuration packet can be addressed to the broadcast address of the network containing the new device. This causes all devices on that physical network to see it, including the hew device. Addressing directly to the new network device's IP address or some address behind it (for routers) will not work in this embodiment of the invention because the new network device has not yet been configured and consequently the ARP address resolving operation would fail. ARP (Address Resolution Protocol) is a known protocol that resolves IP addresses to Ethernet( addresses. Other alternatives than using the broadcast address have been described above in the general description of the invention.

The configuration packet will typically contain the new device's device identifier (or derivation thereof), the device's IP address, netmask, default gateway, and the management station's IP address and device identifier and/or public key. It may also contain information for setting up a shared secret, such as the management station's Diffie-Hellman public value and/or a certificate that will be used to verify that the packet came from the correct management station.

Each party (new network device and management station) needs to be assured that it is communicating directly with the other device and not with some intermediary (man-in-the-middle) that could modify the configuration data as it is transferred. If a single configuration packet is used without a further packet exchange, it may be sufficient to perform one-sided authentication, meaning that the new network device is assured that it receives the configuration packet directly from the management station without any intermediary tampering with the contents of the configuration packet.

Figure 6:
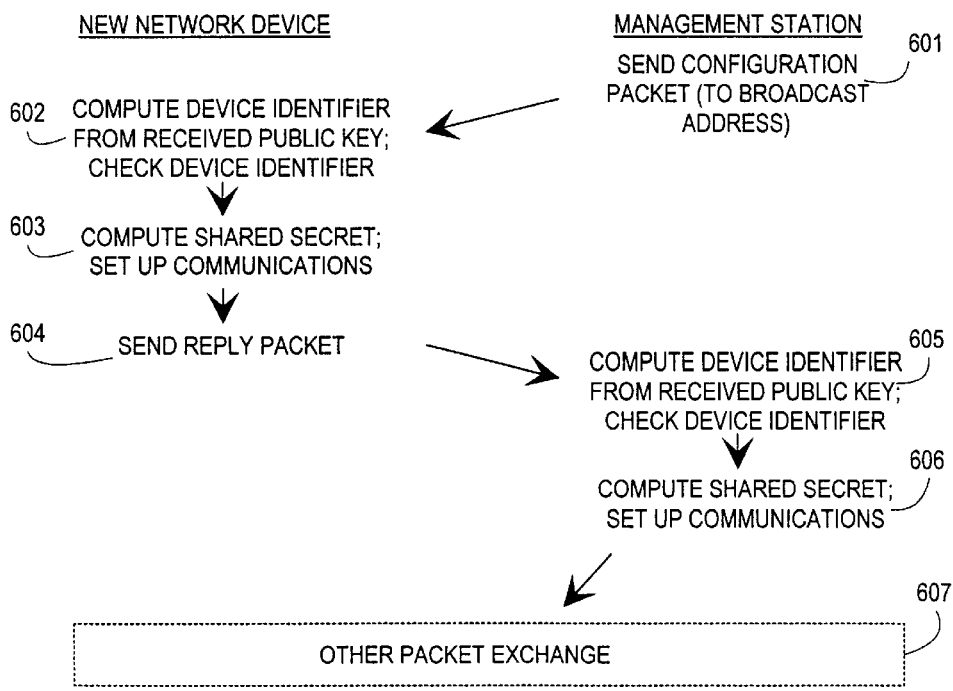
FIG. 6 illustrates a method according to the invention.

To authenticate bidirectionally and to establish security according to FIG. 6, each party will send its public key to the other party. At stage 601 the management station sends its public key to the new network device along with the configuration packet. When a new network device receives the configuration packet labelled with its own device identifier, it computes at stage 602 the transmitting party's device identifier from the public key (and whatever other data might be used in the computation in a particular implementation) included in the configuration packet. It verifies that the device identifier it got by computing matches the known device identifier of the correct management station. The invention does not limit the way how this check is accomplished. There are several possible ways, like the following:

- the network device displays the computed device identifier to a user, and the user verifies it using some out-of-band means (e.g. phone call or checking against written notes), and either accepts or rejects the identifier (e.g. by pressing the appropriate button),
- the device identifier identifying the correct management station has been entered into the new network device beforehand, or a user types it in on location by using a keyboard, and the new network device compares the typed identifier electronically against the computed one, or
- the device identifier is verified using some other means, such as checking a certificate or using a value stored in tamper-resistant memory means to verify that the identifier is acceptable; if a certificate contained in the packet is to be used the network device will most likely have the public key or a certificate of a CA (Certification Authority) in memory.

After checking the identity of the management station at stage 602, the new network device may compute a shared secret at stage 603 using any method known as such, some of which are listed below, and set up whatever method will be used for further communication with the management station. With IPSEC, for instance, it could set up an AH or ESP security association with the management station. At stage 604 the network device sends a reply packet back to the management station, typically containing its own device identifier, its Diffie-Hellman public value or other public key, and other information depending on the particular application.

Upon receiving the reply packet, the management station will verify at stage 605 that the received public key or corresponding value matches the correct device identifier. Same methods may be applied as the other way round at stage 602. The management station may compute the shared secret at stage 606 before setting up whatever method will be used for further communication with the management station.

The calculation of a shared secret at stages 603 and 606 corresponds to cryptographic authentication. Almost any authenticating key agreement method from the literature can be used. Examples include the following:

- Each public key is a Diffie-Hellman public value, and the device identifiers are derived from the public value (e.g. using the SHA1 hash); effectively, each party authenticates each other's public value, and computes the Diffie-Hellman shared secret. Because both public values were authenticated, the resulting shared secret is also authenticated.
- Each public key is a digital signature key (e.g. RSA or DSS), and the device identifiers are derived from the public key (e.g. using the SHA1 hash). The parties first obtain a shared secret (e.g. by a Diffie-Hellman exchange, public key encryption, or some equivalent method), and then digitally sign data used to derive it to prove to the other party that there was no man-in-the-middle.

If the key agreement method uses implicit authentication, it may be necessary to actually use the shared secret to prove its possession to the other party.

Once a shared secret has been established using any method, it can be used to cryptographically authenticate and/or encrypt any further messages. The configuration process may continue with an arbitrary packet exchange 607 protected by the shared secret. A number of well-established methods exist for doing this once the shared secret is available. One possibility is using the IPSEC AH and ESP headers for protecting the rest of the configuration exchange.

It is also conceivable to use symmetric cryptographic keys with tamper-resistant hardware. In this case, the devices typically already have a shared secret key. No explicit authentication is necessary. The parties can directly use their secret key to encrypt or authenticate any messages they send, and the correct key will be needed by the other party to decrypt messages or generate/validate authentication codes. If cryptographic authentication is not required, it may be omitted from stages 603 and 606 altogether.

Appropriate timeouts and recovery mechanisms must be used to cope with packets lost in the network. For instance, a network device may want to disable listening for configuration packets once it has been configured. However, it cannot do so until after it knows the management station has received the reply packet. Alternatively the network device may accept any time a new configuration packet that correctly indicates the management station as the authenticated transmitting party. This way the operation of the network is easy to change online by reconfiguring the appropriate network devices when necessary.

A user's view of the configuration process depends on the method used for verifying the other device's device identifier at stages 602 and 605. The following installation process alternatives give an idea of the possible variations:

Known peer device identifier is explicitly typed in at both management station and new network device.

Known network device identifier is explicitly typed in at the managemement station but not at the new network device. When the management station has sent the configuration packet to the new network device, the new network device will display the computed device identifier of the management station and wait for user confirmation. The user will need to verify the device identifier out-of-band (e.g. by telephone, or having previously written it on paper).

No device identifier typed in on either side; both sides display it on screen for verification.

Figure 7:
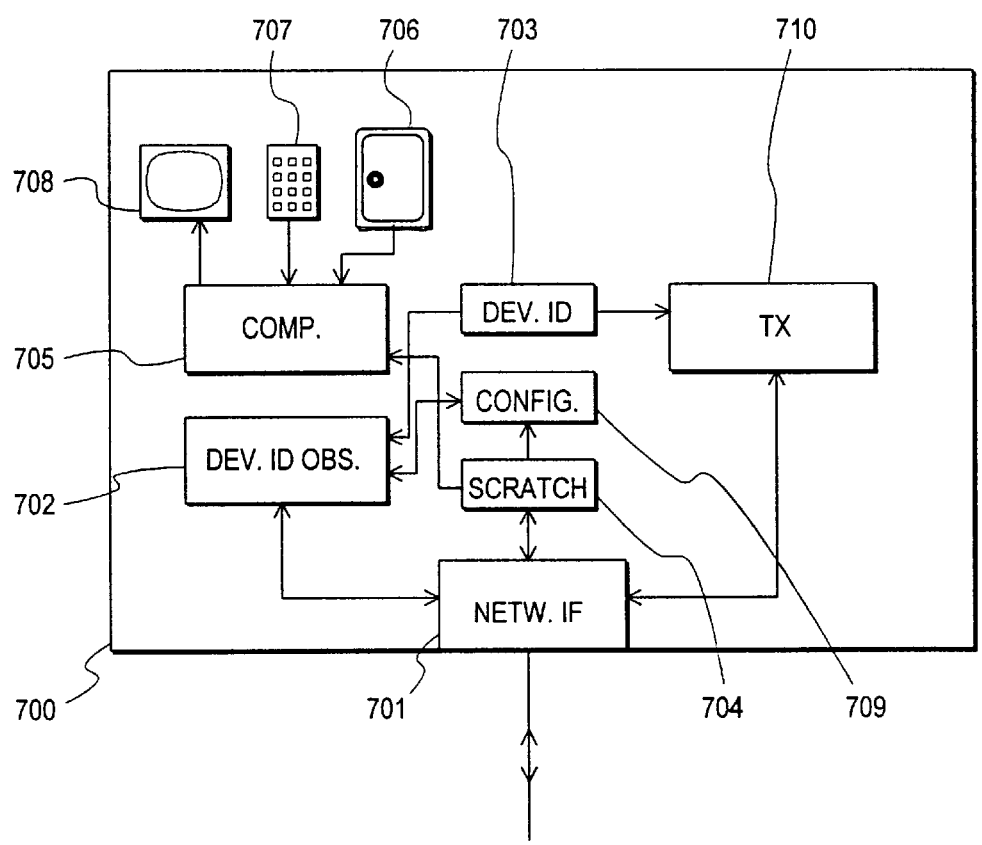
FIG. 7 illustrates a network device according to the invention.

FIG. 7 is a schematic block diagram of those parts of a network device or management station 700 that take part in the operation according to the invention. The following explanation of the block diagram refers to a new network device to be configured but the corresponding functions are equal in a management station, although during the remote configuration of a newly added network device they take place in different order in a management station than in the network device to be configured.

Physical network interface 701 may be any prior art network interface known as such, adapted to receive and transmit packets through the network. Device identifier observation block 702 reads device identifiers from received packets to recognise those packets that are meant for this particular network device. A positive recognition occurs when the device identifier of the received packet coincides with the network device's own previously stored device identifier, read from the appropriate nonvolatile device identification memory 703. A recognised packet will be written into a scratch pad storage 704 so that a computing block 705 may compute the device identifier of the transmitting device from the public key contained in the received and stored packet. To authenticate the transmitting device, the computing block 705 compares the device identifier it has computed against a known correct device identifier inputted by the user through a keypad 707. Alternately the network device 700 may show the computed device identifier in a display 708 and wait for a positive or negative acknowledgement from the user through a keypad 707. It is also possible to have the information used in the authentication read from a tamper-resistant memory 706. A positive comparison or positive acknowledgement causes the configuration parameters contained in the received and stored configuration message to be transferred from the scratch pad storage 704 to a nonvolatile configuration memory 709. If the result of the comparison or acknowledgement is negative, the temporarily stored configuration message is discarded from the scratch pad storage 704 and the network device 700 returns to its original dummy state where it only reads device identifiers from received packets and waits for its own configuration message without processing any other data received from the network.

After the transmitting management station has been correctly authenticated, a transmitter block 710 assembles a reply packet containing at least the network device's own public key read from the device identification memory 703 and the management station's network address read from the configuration memory 709 as the recipient's address. The reply packet is sent through the network interface 701 through the network to the management station.

Alternatively, the computer 705 may be programmed to use the apparatus already described to carry out any of the various other configuration methods described herein or included within the scope of the claims.

Memory blocks 703, 704, 706 and 709 may be any suitable memory circuits known as such. Keypad 707 may be any known keypad or keyboard and display 708 may be a LED display, a LCD screen, a cathode ray tube or any other suitable display known as such. The intelligent blocks 702, 705 and 710 are most advantageously realised in a microprocessor by programming it to perform the necessary functions, which programming as such is within the normal ability of a person skilled in the art. A network device and a management station may naturally contain many other parts as those shown in FIG. 7. Also, the configuration of FIG. 7 is exemplary in the sense that other arrangements may as well be used to reduce the invention into practice.

What is claimed is:

1. A network device for connecting to a network, said network device requiring certain configuration parameters to be stored therein for proper functioning, comprising a physical network interface, a device identifier observation circuit in said network device for reading device identifiers from received packets and recognizing packets containing a device identifier of said network device as being directed to said network device, and a computing block; and wherein said computing block is structured or programmed to authenticated received packets as coming from a reliable source authorized to configure said network device by computing computed device identifiers from cryptographic keys derived from recognized packets and to compare said computed device identifiers against locally stored known device identifiers which identify authentic transmitting parties authorized to configure said network device, said locally stored known device identifiers being compared by said computing block to said computed device identifiers for authentication of transmitting parties, and if a received packet is authenticated in this way, using configuration data therein to configure said network device.

2. A network device according to claim 1, additionally comprising a tamper-resistant memory for holding said locally stored known device identifiers.

3. A network device according to claim 1, additionally comprising means for allowing manual comparison of said computed device identifier to said locally stored known device identifiers for authentication of transmitting parties on the basis of said computed device identifiers.

4. A network device according to claim 1, additionally comprising means for deriving from said cryptographic keys a shared secret for authenticating and optionally encrypting subsequent packets.

5. A method of configuring a network device coupled to a network from a remote management station also coupled to said network to which said network device is coupled, comprising.

transmitting from a management station coupled to a network to a network device to be configured or reconfigured and also coupled to said network a configuration packet containing a device identifier unique to the network device to be configured, and containing configuration data for said network device;

at said network device to be configured or reconfigured, recognizing the device identifier in said configuration packet as said device identifier assigned to the network device to be configured or reconfigured; and using said configuration data of said configuration packet which contains a device identifier unique to said network device to be configured or reconfigured to configure said network device and wherein said network has a broadcast address, and wherein said step of transmitting said configuration packet comprises a step of broadcasting said configuration packet to said broadcast address of said network, and wherein said step of recognizing said device identifier comprises examining each received broadcast packet and discarding packets that do not contain said device identifier of said network device to be configured or reconfigured.

6. A method of configuring a network device coupled to a network from a remote management station also coupled to said network to which said network device is coupled, comprising:

transmitting from a management station coupled to a network to a network device to be configured or reconfigured and also coupled to said network a configuration packet containing a device identifier unique to the network device to be configured, and containing configuration data for said network device;

at said network device to be configured or reconfigured, recognizing the device identifier in said configuration packet as said device identifier assigned to the network device to be configured or reconfigured; and using said configuration data of said configuration packet which contains a device identifier unique to said network device to be configured or reconfigured to configure said network device and wherein said network has a broadcast address, and wherein said step of transmitting said configuration packet comprises a step of broadcasting said configuration packet to said broadcast address of said network, and wherein said step of recognizing said device identifier comprises examining each received broadcast packet and discarding packets that do not contain said device identifier of said network device to be configured or reconfigured and further comprising a step of authenticating said configuration packet as being from said management station and not from some other source not authorized to configure said network device.

7. A method for configuring a network device coupled to a network, comprising:

configuring a network device before installation on a network to operate in a dummy mode upon initial installation on said network such that said network device only reads device identifiers in received packets but does not otherwise process any data therein or processes data in received packets in only a factory-configured manner, and wherein said network has a broadcast address;

transmitting a configuration packet containing configuration data for said network device to be configured from a management station coupled to said network to said broadcast address of said network on which said network device to be configured resides, said configuration packet containing an identifying code of said network device to be configured or data derived from a cryptographic public key from which said device identifier of said network device to be configured can be derived;

at said network device to be configured, receiving said configuration packet transmitted to said broadcast address of said network, and authenticating said management station from which said configuration packet was sent by deriving said device identifier from said identifying code or said data derived from said cryptographic public key and comparing said device identifier so derived to said device identifier of said network device to be configured, and discarding any packet which does not contain a device identifier matching said device identifier of said network device to be configured;

using or decrypting and using said configuration data contained in said configuration packet to configure said network device.

8. A method for configuring a network device, comprising:

(1) configuring a network device before installation on a network to operate in a dummy mode upon initial installation on said network such that said network device reads device identifiers in received packets but does not otherwise process any data therein or processes data in received packets in only a factory-configured manner, and wherein said network has a broadcast address;

(2) transmitting a configuration packet containing configuration data for said network device to be configured from a management station coupled to said network to either said broadcast address of said network on which said network device to be configured resides or directly to said network address of said network device to be configured if said network device is initially configured to operate in dummy mode but to have a network address, said configuration packet containing a public key of said management station and data derived from a cryptographic public key from which said device identifier of said network device to be configured can be derived or said device identifier itself of said network device to be configured or an identification code corresponding to said device identifier of said network device to be configured;

(3) at said network device to be configured, receiving said configuration packet transmitted to said broadcast address or transmitted directly to said network address of said network device to be computed and deriving or reading the device identifier therein and comparing the device identifier so read or computed to said device identifier of said network device to be configured, and discarding any packets which do not match;

(4) using said public key contained in any configuration packets retained after step (3) to authenticate said management station from which said configuration packet was sent by deriving said device identifier from said public key transmitted with said configuration packet and either comparing said device identifier so derived to said device identifier of said management station which has been prestored in said network device to be configured or displaying said device identifier computed from said public key and waiting for a user to manually verify that said displayed device identifier computed from said public key is correct or otherwise authenticating that said configuration packet definitely came from said management station in any other known way, and discarding any packet which does not contain a device identifier matching said device identifier of said management station;

using or decrypting and using said configuration data contained in said configuration packet to configure said network device to create a newly configured network device.

9. The method of claim 8 further comprising the step of sending a reply packet from said newly configured network device to said network management station, said reply packet including a public key for said network device.

10. The method of claim 8 further comprising the step of computing a shared secret in said newly configured network device and setting up a secure communication link with said management station, and then sending a reply packet back to said management station containing said device identifier of said newly configured network device and a public key for said newly configured network device.

11. The method of claim 8 further comprising the steps of computing a shared secret in said newly configured network device and setting up a secure communication link with said management station, and then sending a reply packet back to said management station containing said device identifier of said newly configured network device and a public key for said newly configured network device, whereupon said network management station authenticates said newly configured network device as the source of said reply packet by computing a device identifier from said public key in said reply packet and comparing that device identifier to said device identifier of said newly configured network device, and computing said shared secret.

12. The method of claim 10 wherein the step of sending said public key from said newly configured network device to said management station and vice versa comprise sending a Diffie-Hellman public value from said network device to said management station and vice versa and wherein said steps of computing of shared secrets performed by said network device and said network management station comprise the steps in each of said network device and said management station of authenticating each other's public value and computing the Diffie-Hellman public value which will be automatically authenticated by virtue of authentication of each public value.

13. The method of claim 10 wherein the step of sending the public key from said newly configured network device to said network management station and vice versa comprise sending a digital signature key such as an RSA or DSS value, and wherein the step of sending data derived from a cryptographic public key in said configuration packet comprises sending device identifiers derived from said public keys, and wherein the steps of computing of shared secrets performed by said network device and said network management station comprises the steps in each of said network device and said network management station of performing a Diffie-Hellman exchange or public key encryption and then digitally signing data used to derive said shared secret to authenticate said shared secret.

14. The method of claim 8 further comprising the steps of computing a shared secret in said newly configured network device and setting up a secure communication link with said management station, and then sending a reply packet back to said management station containing the device identifier of said newly configured network device and a public key for said newly configured network device, whereupon said management station authenticates said network device which sent said reply packet by computing a device identifier from said public key in said reply packet and comparing that device identifier to said device identifier of said newly configured network device, and computing said shared secret, and thereafter using said shared secret to cryptographically authenticate and/or encrypt any further packets exchanged between said newly configured network device and said management station.

15. A method for configuring a network device, comprising:

(1) configuring a network device before installation on a network to operate in a dummy mode upon initial installation such that said network device only reads device identifiers in received packets but does not otherwise process any data therein or processes data in received packets in only a factory-configured manner, said network having a broadcast address;

(2) transmitting a packet from a management station coupled to said network to either said broadcast address of said network on which said network device to be configured resides or directly to a network address of said network device to be configured if said network device is initially configured to operate in dummy mode but to have a network address on said network, said configuration packet containing configuration data for said network device and a public key of said management station and a device identifier for said network device to be configured, said device identifier for said network device to be configured being either a cryptographic public key or derived from a cryptographic public key or a certificate accompanying said cryptographic public key, or an identification code corresponding to said device identifier;

(3) at the network device to be configured, receiving said configuration packet sent to said broadcast address of said network, or sent directly to said network device's network address and deriving or reading said the device identifier therein and comparing said device identifier so read or computed to said device identifier of said network device to be configured, and discarding any packets which do not match;

(4) using said cryptographic public key contained in any configuration packets retained after step (3) to authenticate said management station from which said configuration packet was sent by deriving said device identifier from said cryptographic public key transmitted with said configuration packet and either comparing said device identifier so derived to a prestored device identifier of said management station or displaying said device identifier computed from said public key and waiting for a user to manually verify that the device identifier so displayed is correct or otherwise authenticating that said configuration packet definitely came from said management station in any other known way, and discarding any packet which does not contain a device identifier matching said device identifier of said management station;

(5) sending a reply packet from said network device to said management station, said reply packet including a public key for said network device;

(6) computing a shared secret in said network device from said public key of said management station, and computing a shared secret in said management station from said public key of said network device;

(7) setting up a secure communication link between said management station and said network device using said shared secret to authenticate and/or encrypt packets to be exchanged;

(8) sending a configuration packet to said network device to be configured;

(9) authenticating and/or decrypting said configuration packet using said shared secret, and, if authentic, using said configuration data contained in said configuration packet to configure said network device.

16. A method for configuring a network device, comprising:

(1) configuring a network device before installation on a network and a management station also on said network to have a shared secret key stored in tamper resistant manner, said network having a broadcast address;

(2) configuring said network device to operate in a dummy mode upon initial installation such that said network device only reads device identifiers in received packets but does not otherwise process any data therein or processes data in received packets in only a factory-configured manner;

(3) transmitting a configuration packet from a said management station to either said broadcast address of the network on which said network device to be configured resides or directly to a network address of said network device to be configured if said network device is initially configured to operate in dummy mode but to have a network address, said configuration packet containing configuration data for said network device and the device identifier for said the network device to be configured or cryptographic data from which said device identifier can be computed;

(4) at said network device to be configured, receiving said configuration packet transmitted to said broadcast address or said configuration packet transmitted directly to said network address of said network device to be configured and deriving or reading said device identifier therein and comparing said device identifier so read or computed to said device identifier of said network device to be configured, and discarding any packets which do not match;

(5) using said secret key stored in said network device to authenticate the source of said configuration packet as coming from said management station and discarding said the configuration packet if it did not come from said management station;

(6) authenticating and/or decrypting said configuration packet using said secret key, and, if authentic, using said configuration data contained in said configuration packet to configure said network device or simply using said the configuration data in said configuration packet to configure said network device if said configuration data is not encrypted.

* * * * *